June 1, 1948.   R. C. WESTER   2,442,743
COMBINATION END GATE AND FEEDING AND SPREADING
DEVICE FOR USE ON DUMP TRUCKS
Filed March 22, 1944   2 Sheets-Sheet 1
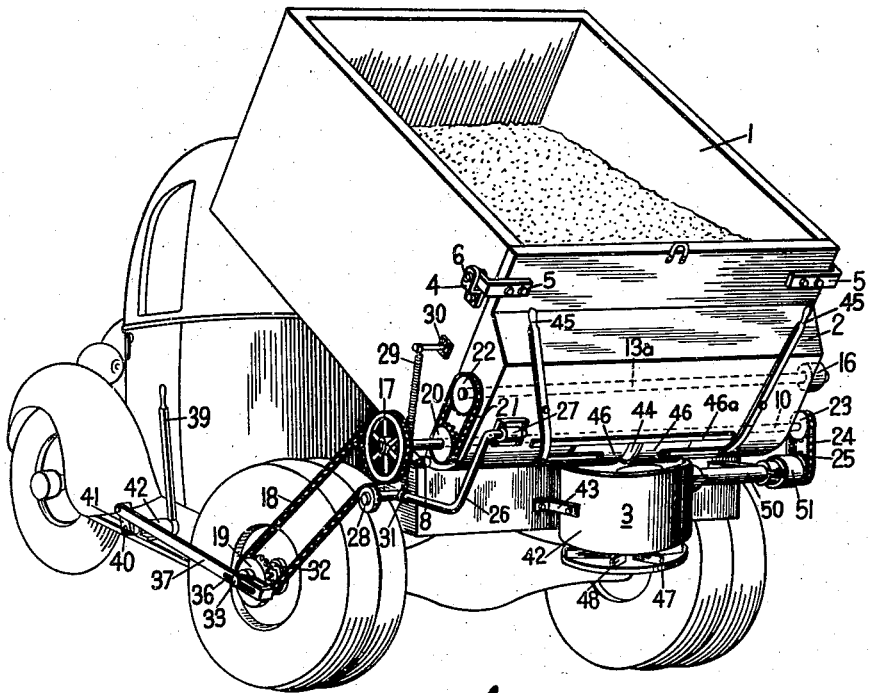
Fig. 1
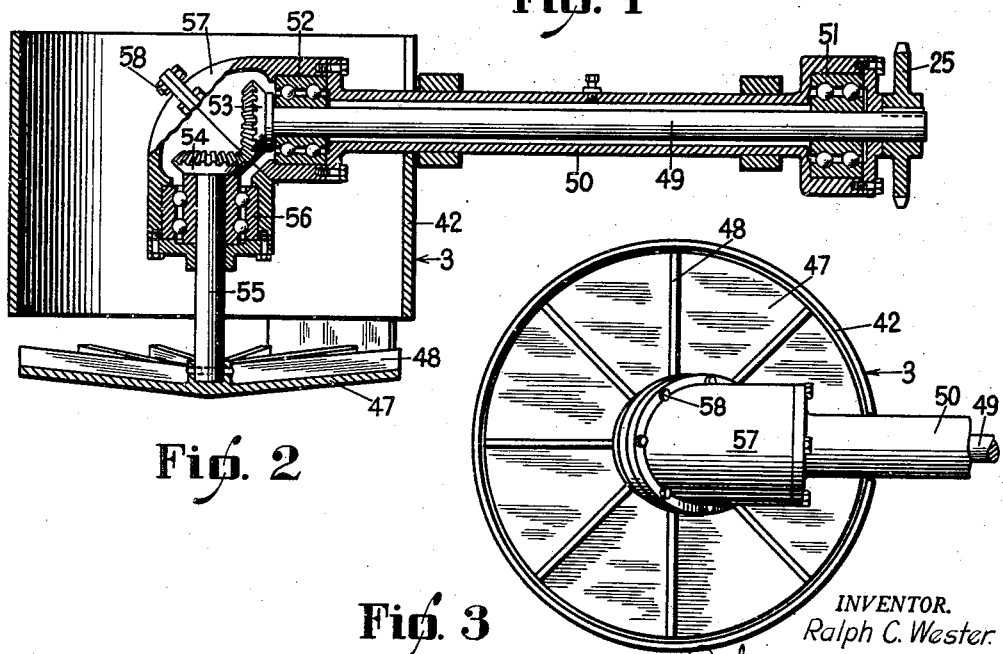
Fig. 2
Fig. 3
INVENTOR.
Ralph C. Wester.
BY Corbett, Mahoney & Miller
ATTORNEYS June 1, 1948. R. C. WESTER 2,442,743
COMBINATION END GATE AND FEEDING AND SPREADING
DEVICE FOR USE ON DUMP TRUCKS
Filed March 22, 1944 2 Sheets-Sheet 2
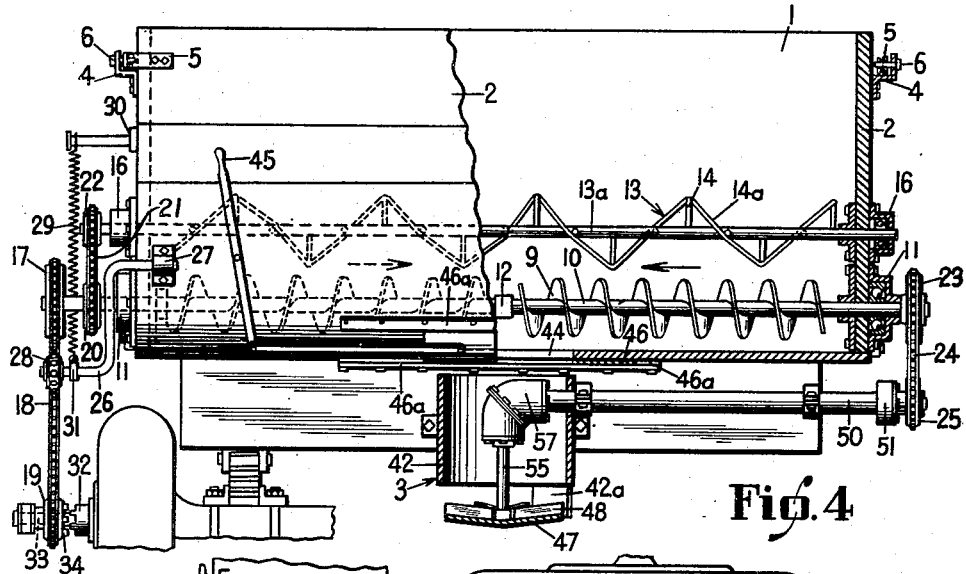
Fig. 4
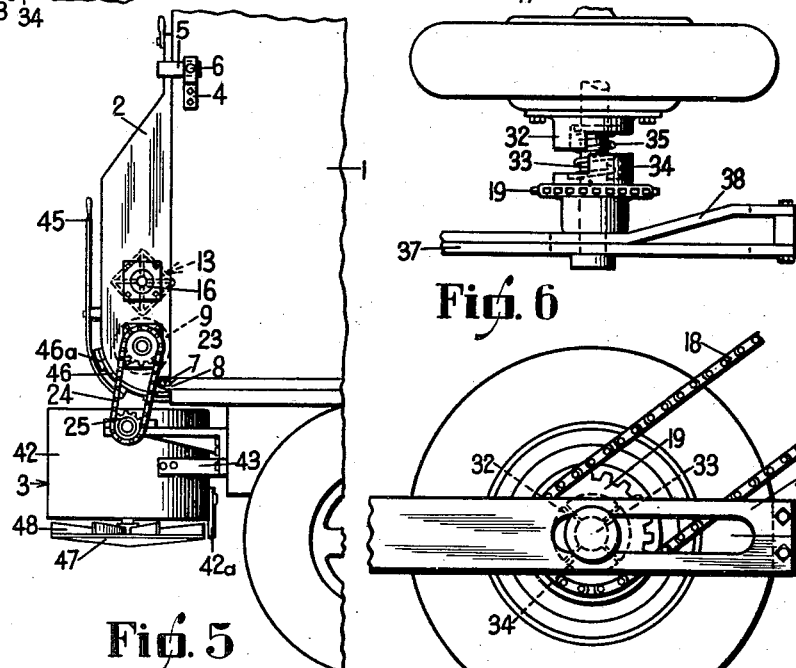
Fig. 5
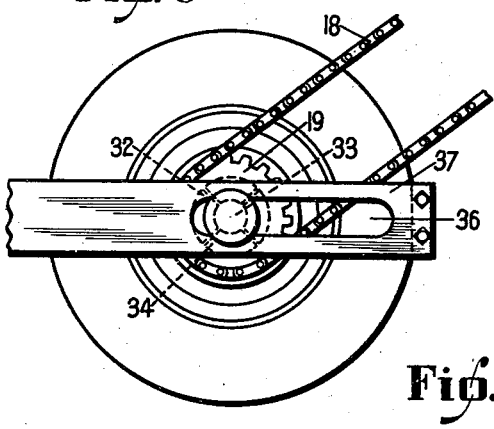
Fig. 6
Fig. 7
INVENTOR.
Ralph C. Wester.
BY Corbett, Mahoney & Miller
ATTORNEYS Patented June 1, 1948

2,442,743

UNITED STATES PATENT OFFICE 2,442,743

COMBINATION ENDGATE AND FEEDING AND SPREADING DEVICE FOR USE ON DUMP TRUCKS

Ralph C. Wester, Plain City, Ohio, assignor of one-half to A. G. Kirby, Plain City, Ohio Application March 22, 1944, Serial No. 527,544

2 Claims. (Cl. 275—8)

My invention relates to a combination end gate and feeding and spreading device for use on dump trucks. It has to do, more particularly, with an end gate structure having a feeding and spreading device connected thereto which will feed and spread lime, fertilizer, seed, cinders, sand, calcium chloride and other similar materials from the dump body of the truck.

This application is a continuation-in-part of my co-pending application Serial No. 463,840, filed October 29, 1942 (abandoned). Since the filing of the co-pending application, applicant has devised improvements which greatly add to the efficiency of the feeding and spreading devices which are combined in the present case. Applicant is also aware of various prior art fertilizer spreaders but has found that they possess many disadvantages which detract from their efficient operation. One of the main disadvantages of the prior art spreaders is that it is necessary to have a man positioned in the back of the vehicle to keep shoveling the material into the spreader. As was pointed out in the co-pending application this disadvantage is more acute today because of the shortage of farm labor. Furthermore, the task of shoveling material is unhealthful, and this is particularly true when the material being spread is lime or calcium chloride. Another great disadvantage of the prior art spreaders is that they do not feed or spread the material evenly over the field. This is due to the fact that when the hopper is being filled by a man with a shovel some of the material spurts through the opening to the spreader member and at the point where it is shoveled into the spreader a greater deposit of the material was found and this nonuniform spreading results in a waste of material when a large acreage is being treated.

Another disadvantage of the prior art devices of this type is that none of them discloses a positively actuated centrifugal spreader of the type disclosed in the present application. In applicant's prior application it was found that the friction spreader member which is dragged beneath the truck was wholly inadequate because of the fact that it was too close to the ground and also because rocks and ruts in the ground tilted and sometimes overturned the small spreader member. Furthermore, it was found that the centrifugal spreader member should rotate at a greater speed than the conveyer feeder member in the end gate. The spreader member of the co-pending application did not attain a wide coverage because of its speed and its location so close to the ground. While it satisfied the needs in certain regards, such as spreading cinders in a road, it did not come up to expectations in the feeding of lime, fertilizer and seed.

One of the objects of my invention is to provide a feeding device for fertilizing or liming a field evenly with less labor than was required in the past.

Another object of my invention is to provide a dump truck with an end gate having means for feeding lime or similar material which is in no way unhealthful to the operator.

Another object of my invention is to provide a dump truck having a feeding and spreading apparatus which coats a field with lime, seed, or similar material in such a manner that great savings in material are realized.

Another object of my invention is to provide a dump truck with a combination end gate with a feeding apparatus which feeds the material to a positively actuated centrifugal spreader in an even stream.

Another object of my invention is to provide a dump truck with an end gate in combination with a feeding device and a centrifugal spreader which can be easily removed from the truck so as to allow the truck to be used for other purposes.

Another object of my invention is to provide in combination, feeding and spreading members which derive their power from the rear axle of the truck and which can be connected to and disconnected from the axle by means located in the front of the truck.

Another object of my invention is to provide a feeder and a spreader with power from the same source, yet to operate the spreader at a greater speed than the feeder.

Another object of my invention is to provide an end gate having in combination with a feeder member which will feed material through an opening in the end gate and the opening may be so adjusted as to feed the material to either side of a spreader member disposed below the opening.

Another object of my invention is to provide a rotatable agitating means above the feeder which has a ribbon type conveyer for giving a spiral motion to the material previous to its contact with the spiral conveyers disposed below the agitating members.

Many other objects and advantages will be apparent from the following description, the drawings and the claims.

In its preferred form, my invention comprises an end gate which can be suitably connected to the rear end of a dump truck and which carries a screw conveyer and an agitator which are driven by the driving mechanism of the truck. My invention also includes the combination of a positively actuated centrifugal spreader member disposed below an opening in the center and at the bottom of the end gate through which the material is fed. The conveyer, the agitator, and the spreader device are all operated by the same driving mechanism and the conveyer and agitator are operated at the same speed while the spreader member is operated at a greater speed than the agitator and conveyer. While I describe my invention as spreading fertilizer or lime, it is understood that it can be used for spreading sand, salt or cinders on icy roads or on city street corners. It can also be used in spreading calcium chloride to settle dust, as well as for seeding fields.

The preferred embodiment of my invention is shown in the accompanying drawings wherein similar characters of reference designate corresponding parts and wherein:

Figure 1 is a perspective view of a dump truck with my combination end gate, feeding device and spreader member shown in association therewith.

Figure 2 is a side elevational view in section of the spreader member and the driving shaft for operating the same.

Figure 3 is a top plan view of the spreader member.

Figure 4 is a rear end view of the gate partly broken away showing the feeder member, the agitator, the spreader member, and means for driving the aforementioned members.

Figure 5 is a side elevational view of the end gate showing the spreader device in association with the rear end of a dump truck.

Figure 6 is a top plan view showing one of the rear wheels of a truck with a clutching mechanism associated therewith.

Figure 7 is a side elevational view of the wheel shown in Figure 6 illustrating the operating bar for operating the clutch shown in Figure 6.

Referring more particularly to the drawings, I illustrate a dump truck of the conventional type with my end gate 2 and spreader unit 3 shown in association therewith. The end gate is of such a design and size that it may be readily attached to the rear of any dump truck with very little change in the structure of the conventional truck. Furthermore, the gate is adapted so that it may be easily and quickly removed if it is desired to use the truck for other purposes.

The end gate 2 is so constructed that it can be mounted on the rear end of the dump body of the truck in the manner shown in Figures 1 and 5. A pair of ear members 4 supported on the sides of the dump body of the truck and which extend outwardly therefrom permit the insertion of one end of the bracket members 5 which have holes formed therein and pin members 6 passed through the holes formed in the ear members 4 and the holes in the bracket 5, thus firmly holding the end gate in position. Since this structure is conventional for holding end gates of the usual design, very little change will have to be made in the truck to support the end gate. As in other end gates the hooked member 8 engages the pins 7 supported on the end gate and holds the bottom of the end gate against the body of the truck. The means just described firmly holds the end gate in position against all vibration and tendency to loosen during the operation of the feeding and spreading devices.

As in my co-pending application, I make use of the gravity feed of the material by raising the dump body of the truck in order to get the material to flow to the rear of the truck. The means which I use to feed the material to the opening in the end gate is also similar to that shown and described in my co-pending application. The feeding means comprises a screw conveyer 9 which is integrally formed on a transverse shaft 10 and supported in bearing members 11 disposed in the side walls of the end gate structure. The conveyer 9 has right and left hand sections which are adapted to feed the material to the center of the end gate and away from the sides of the truck. The right and left hand sections 9 are secured at their center by means of a coupling 12. I provide an agitator member 13 above the screw conveyer so as to break up lumps and clods of the material being fed previous to engagement by the conveyer. The agitator member consists of a shaft 13a having finger members 14 projecting therefrom and having their outer ends connected by a ribbon or bar 14a. The shaft 13a is supported by bearing members 16 and the one end thereof has a sprocket 22 keyed thereon.

The feeding member 9, the agitator 13, and the centrifugal spreader unit 3 are all powered from the rear axle of the truck. This is accomplished by rotating the shaft 10 which extends through both side walls of the end gate and has sprockets keyed thereon. On the left hand side of the shaft 10 on the outer end thereof is keyed a sprocket 17 which is driven by means of a chain 18 which has its one terminal around a sprocket 19 mounted on the rear axle of the truck. Also keyed on the shaft 10 on the left hand side of the truck is another sprocket 20 which has a chain 21 for engaging the sprocket 22 keyed on the shaft 13a of the agitator member. Thus, when the shaft 10 is rotated by reason of the sprockets 17, 19 and the chain 18 the sprockets 20 and 22 will also turn because of the chain member 21 connecting the two. On the right hand end of shaft 10 a sprocket 23 is keyed and a chain 24 engages this sprocket as well as a sprocket 25 which is supported on a horizontal shaft which is connected to the centrifugal spreader unit. This unit and its operation will be described hereinafter.

Referring back to the left hand side of the shaft 10 it will be noted that as the dump truck is raised there will be a tendency for the chain 18 to become loose by reason of the fact that the sprockets 17 and 19 are moved closer together. Therefore, it is necessary to have a take-off device for engaging the chain 18 when the sprockets are moved relative to each other. To remedy this I provide an L-shaped arm 26 which has its one end supported in a bearing member 27 carried on the rear wall of the end gate and has its other end adjacent the chain 18 with a sprocket member 28 carried thereon for actually engaging said chain at all times. A tension spring 29 which has its upper end anchored on the side of the dump body as at 30 has its other end connected to the arm member 26 at 31. Thus when the dump body is raised the spring 29 will tend to pull the arm 26 upwardly as shown in Figure 1.

The truck can be operated with the driving mechanism disconnected from the feeder and spreader units but when it is desired to start feeding the material a simple clutching mechanism is actuated to transmit power to the feeding and spreading units. Referring particularly to Figures 1, 6 and 7 of the drawings, the details of the clutching unit can be more clearly understood. I prefer to use a jaw clutch of the conventional type in my device. The stationary half of the clutch is represented by the numeral 32 which is carried on the wheel as shown in Figure 6. An extension of the axle 33 carries the moving part of the jaw clutch 34 that is integrally formed on the sprocket 19. The clutch 34 is normally held out of engagement from the clutch 32 by means of the spring member 35. The extension of the axle 33 projects through a slot 36 formed on a link member 37. The sprocket 19 will be rotated whenever the clutch 32 is in engagement with the clutch 34. To force the sliding half of the clutch 34 into engagement with the stationary half 32, I provide a wedging portion 38 on the link 37. Thus, when the link is moved forward by means of the lever 39 as shown in Figure 1, the clutch 34 will be forced inwardly and engage the clutch 32. This is caused by the wedging action of member 38. The lever 39 is supported on a horizontal stub shaft 40 which also has a rocker arm 41 pivotally connected to the link 37. The stub shaft 40 is carried by the bearing member 42 which is suitably bolted on the running board of the truck. It is not believed essential to give a more detailed description of the clutching mechanism since it is of conventional form and is operated in the usual manner. When the clutch is in operating relationship with the wheel and axle of the truck the sprocket 19 will rotate thus operating the chain 18 which in turn operates the sprocket 17 on the shaft 10.

The operation of the centrifugal spreader unit is also controlled by the shaft 10 which is operated as previously described. Referring to Figures 2, 4 and 5, I will now describe the operation of the centrifugal spreader unit 3. The spreader housing 42 is carried by the chassis of the truck by means of the supporting brackets 43. The unit is preferably supported at the center of the truck so that the opening 44 in the end gate coincides therewith. The size of the opening 44 can be regulated by means of the levers 45 which slidably move the members 46 in trackways 46a on the end gate.

The centrifugal spreader member comprises a circular housing 42 previously discussed which is supported by the brackets 43 on the chassis of the truck. A guard member 42a is provided and is attached to the outside housing 42 and protects the rear wheels of the truck. Below and in line with this housing is a spreader disk 41, as shown in Figure 2, which is provided with vane members 48 that are carried on the upper surface of the disk 47 and aid in the distribution of the material being fed to the housing 42 from the opening in the end gate. As was previously described, the sprocket 25 which is keyed on the horizontal shaft 49 is actuated by means of the chain 24 and sprocket 23 carried on the shaft 10. Due to the fact that the chain 24 is of a short length and because the pivot of the dump body at this point is very slight, it is not necessary to provide a take-up device as in connection with the chain 18. The shaft 49 is positioned inside a grease retaining housing 50 and has a bearing housing 51 on its outer end and a bearing housing 52 on its inner end. The inner end of the shaft carries a bevel gear 53 which meshes with a bevel gear 54 supported on the upper end of the vertical shaft 55. The lower end of the shaft 55 is suitably connected to the spreader disk 47, as shown best in Figure 2. The shaft 55 also has a bearing 56 adjacent the gear structure in the manner similar to the bearing 52 with regard to the horizontal shaft 49. These bearing members are necessary for a smooth working unit. I also provide a housing 57 which encloses the mechanism of the gears and bearings. The need for the housing 57 is apparent since the material being fed would hinder the operation of the gears if not enclosed. I preferably use a two-part housing which is bolted together as at 58, so that the unit may be easily assembled and disassembled. The shaft 49 will thus transmit the power received from the sprocket and chain 25 and 24 respectively to the vertical shaft 55 through the means of the bevel gears 53 and 54. This power will operate the spreader disk 47 at a greater speed than the conveyer and agitator because of the difference in size of the sprockets 23 and 25. The operation of the disk 47 at the increased speed is necessary to get a wider throw of the material being fed.

The operation of my device will be apparent from the previous description but it is thought advisable to cover it generally at this time. As was previously indicated the feeding of the material from the truck and end gate structure can be accomplished by the driver of the truck at the front of the truck. The driver can operate the clutching mechanism by the lever 39, thus throwing the clutch in engagement so as to actuate the sprockets 19 and 17 through the medium of the chain 18, thus turning the shaft 10 which has sprockets 20 and 23 keyed thereon which in turn are connected to sprockets 22 and 25 by means of the chains 21 and 24, respectively. The agitator 13 is thus actuated and at the same time power is transmitted to the spreader disk 47 through the sprocket 25, the horizontal shaft 49, the bevel gears 53 and 54, and the vertical shaft 55. Since the gearing is reduced between the sprocket 25 and the disk 47, it will run at a greater speed than the agitator 13 or the screw conveyer 9. It will be apparent from the above description, the drawings, and the following claims that I provide a feeder and spreader device which has many advantages over those of the prior art.

While I have described my device as being run from the rear axle of the truck, it is understood that a separate driving connection could be made which would still come within the scope of my invention. My invention further encompasses the idea of a separate power unit other than the power unit of the truck which could be used instead of the means which I describe.

Having thus described my invention, what I claim is:

1. In combination with a truck having a dump body, an end gate having end walls, means for removably attaching the end gate to the rear portion of the dump body, said end gate having an opening formed in the lower part thereof, a screw conveyer supported by the end gate adjacent said opening, an agitator also supported by the end gate and located above said conveyer, a centrifugal spreader located below the opening in said end gate and supported by the chassis of the truck, a sprocket for driving said conveyer, a second sprocket for driving said agitator, a sprocket carried on an extension of the rear axle, a sprocket chain engaging and cooperating with the sprocket on the axle and the sprocket on the conveyer, a second sprocket carried on the conveyer shaft, a chain for cooperating with the sprocket of the agitator and the said second-named sprocket on the conveyer shaft, a third sprocket located on the conveyer shaft, a sprocket for driving the centrifugal spreader unit, a chain for driving said last-named sprockets and means comprising a clutch for engaging the sprocket carried on the extension of the axle of the truck so that said sprocket will be driven, thus driving the chain to the sprocket of the conveyer, said other previously mentioned sprockets being driven when the conveyer sprocket is driven, thus operating the agitator, the conveyer and the centrifugal spreader member from a single source of power.

2. A structure according to claim 1 wherein a lever is provided for actuating the clutch from the front end of the truck.

RALPH C. WESTER.

REFERENCES CITED

The following references are of record in the file of this patent:

UNITED STATES PATENTS

| Number | Name | Date |
|---|---|---|
| 361,543 | Pegues | Apr. 19, 1887 |
| 1,182,747 | Brown | May 9, 1916 |
| 1,285,183 | Holden | Nov. 19, 1918 |
| 1,405,001 | Reichelt | Jan. 31, 1922 |
| 1,798,189 | Brzinski | Mar. 31, 1931 |
| 1,928,030 | Putnam | Sept. 26, 1933 |
| 2,180,044 | Frank | Nov. 14, 1939 |
| 2,297,089 | Walsh | Sept. 29, 1942 |